United States Patent
Sampath et al.

(10) Patent No.: US 11,605,986 B2
(45) Date of Patent: Mar. 14, 2023

(54) SYSTEMS AND METHODS FOR WIRELESS POWER AND DATA TRANSFER FOR CONNECTORS

(71) Applicant: Colder Products Company, St. Paul, MN (US)

(72) Inventors: Ramabhadran Sampath, Karnataka (IN); Vijay Tippanna Talikoti, Karnataka (IN); Gautham Ramamurthy, Karnataka (IN)

(73) Assignee: Colder Products Company, Roseville, MN (US)

( * ) Notice: Subject to any disclaimer, the term of this patent is extended or adjusted under 35 U.S.C. 154(b) by 179 days.

(21) Appl. No.: 16/765,264

(22) PCT Filed: Dec. 19, 2018

(86) PCT No.: PCT/IB2018/001576
§ 371 (c)(1),
(2) Date: May 19, 2020

(87) PCT Pub. No.: WO2019/123012
PCT Pub. Date: Jun. 27, 2019

(65) Prior Publication Data
US 2020/0373790 A1    Nov. 26, 2020

(30) Foreign Application Priority Data
Dec. 19, 2017  (IN) .............................. 201741045525

(51) Int. Cl.
*H02J 50/80*   (2016.01)
*H02J 50/10*   (2016.01)
*F16L 25/01*   (2006.01)
*F16L 29/04*   (2006.01)

(52) U.S. Cl.
CPC .............. *H02J 50/80* (2016.02); *F16L 25/01* (2013.01); *F16L 29/04* (2013.01); *H02J 50/10* (2016.02)

(58) Field of Classification Search
CPC . H02J 50/80; H02J 50/10; F16L 25/01; F16L 29/04
USPC ......................................................... 251/148
See application file for complete search history.

(56) References Cited

U.S. PATENT DOCUMENTS

| | | | |
|---|---|---|---|
| 5,052,941 A | 10/1991 | Hernandez-Marti | |
| 5,605,182 A | 2/1997 | Oberrecht et al. | |
| 5,865,329 A * | 2/1999 | Gay ........................ | B61G 5/08 213/1.3 |

(Continued)

OTHER PUBLICATIONS

International Search Report and Written Opinion in International Application No. PCT/IB18/01576, dated Aug. 19, 2019, 10 pages.

*Primary Examiner* — Alfonso Perez Borroto
(74) *Attorney, Agent, or Firm* — Fish & Richardson P.C.

(57) ABSTRACT

A system and a method for wireless power and data transfer for connectors. The connector system is adapted for coupling two devices and for wirelessly transferring power and/or data from a first device to a second device. At the transmitting end, the system comprises of a power source, a self-resonating sinewave oscillator, a tuning circuit a, and a transmitter coil for processing and transmitting the power and/or data. At the receiving end, the system comprises a receiver coil, a proximity sensor, a signal modulator, a signal de-modulator, a bridge rectifier, a DC-DC regulator for processing and providing the power and/or date to a load.

10 Claims, 7 Drawing Sheets

(56) References Cited

U.S. PATENT DOCUMENTS

| | | | |
|---|---|---|---|
| 6,649,829 B2 | 11/2003 | Garber et al. | |
| 6,705,478 B1 * | 3/2004 | Engle | B60D 1/64 |
| | | | 213/1.3 |
| 6,776,299 B1 * | 8/2004 | Trescott | B61G 5/06 |
| | | | 213/75 R |
| 6,897,374 B2 | 5/2005 | Garber et al. | |
| 7,352,771 B2 | 4/2008 | Garber et al. | |
| 7,394,375 B2 | 7/2008 | Johnson | |
| 7,647,954 B2 | 1/2010 | Garber et al. | |
| 8,905,089 B2 | 12/2014 | Evans | |
| 10,097,991 B2 * | 10/2018 | Tandai | H04W 28/0215 |
| 2005/0121971 A1 * | 6/2005 | Ring | B61L 15/0027 |
| | | | 303/7 |
| 2008/0308271 A1 | 12/2008 | Chouzenoux | |
| 2010/0241295 A1 * | 9/2010 | Cooper | B60T 17/228 |
| | | | 701/19 |
| 2013/0196519 A1 | 8/2013 | Krause | |
| 2013/0319567 A1 * | 12/2013 | Brown | B60D 1/64 |
| | | | 138/109 |
| 2014/0209756 A1 * | 7/2014 | Brown | B61L 15/0054 |
| | | | 246/169 R |
| 2016/0056664 A1 * | 2/2016 | Partovi | H02J 7/0042 |
| | | | 307/104 |
| 2017/0100056 A1 * | 4/2017 | Zhu | A61B 5/0015 |

* cited by examiner

SYSTEMS AND METHODS FOR WIRELESS POWER AND DATA TRANSFER FOR CONNECTORS

CROSS-REFERENCE TO RELATED APPLICATIONS

This application is a National Stage application under 35 U.S.C. § 371 of International Application No. PCT/M2018/001576, having an International Filing Date of Dec. 19, 2018, which claims priority to IN Application Serial No. 201741045525, filed on Dec. 19, 2017. The disclosure of the prior application is considered part of the disclosure of this application, and is incorporated in its entirety into this application.

TECHNICAL FIELD

The present disclosure relates to a contactless power and data transfer and more particularly to a system and method for contactless power and data transfer for hybrid connectors with fluid, pneumatic, electric, or electronic connectors.

BACKGROUND

The Existing Hybrid Coupling eliminates the need for multiple connectors and simplifies the user interface between remote tools and a device. The hybrid connectors are widely used in multiple industries such as medical, biopharmaceutical, chemical handling, liquid cooling of electronics, industrial printing, communication equipment, networking, data storage, computer & peripherals, aerospace and defense equipment and systems. Based on the type of applications the hybrid connectors can be customized to suit the desired requirement.

More specifically, the hybrid coupling allows designers to specify a single connector for both fluids and electronics. The streamlined interface allows design engineers to adapt the product to their needs with many customization options available. Based on the customer requirement, customization of the couplings with more number of signal connections are possible.

Though the existing hybrid coupling has multiple advantages, the major drawback includes presence of multiple physical connections for signals and power transfer. Below are few other drawbacks associated with the existing hybrid connectors:
1. The connectors are generally built on specific customer requirement and are complex.
2. Since these are physical connections, every insertion and removal of mating connectors will have ware and tare.
3. Cables terminated to each of these connectors are bulky.
4. Due to multiple physical connections there will be restriction in signal transfer and actual fluid connection.
5. Since the hybrid connections are specific to customer, there is no standardization of part and cost.
6. Customizing for different customer needs like adding more signal lines or fluid lines is complex and requires more engineering efforts.

In view of the foregoing, there is a need for a contactless power and data transfer for the hybrid connectors which are independent of the number of electrical connections, easily configurable, maximum threshold for the electrical signal, capable of handling electrical signals of both analog and digital signals, etc.

The above-mentioned shortcomings, disadvantages and problems are addressed herein and which will be understood by reading and studying the following specification.

SUMMARY

The present disclosure describes a system and method for contactless power and data transfer for hybrid connectors. The system is adapted for coupling two devices wirelessly for transferring power and data from a first device to a second device. At the transmitting end, the system comprises of a power source, a self-resonating sinewave oscillator, a tuning circuit, a transmitter coil, and a Software Defined Radio for processing and transmitting the power and/or data. At the receiving end, the system comprises a receiver coil, a proximity sensor, a signal de-modulator, a bridge rectifier, a DC-DC regulator for processing and providing the power and/or date to a load.

An object of the present disclosure is to provide a contactless interface for power transfer for hybrid connector between couplings An object of the present disclosure is to provide a contactless interface for signal transfer for hybrid connectors.

An object of the present disclosure is to provide a standard configuration for hybrid connector design.

An object of the present disclosure is to provide a unique method to generate orthogonal sequence from the application stand point.

An object of the present disclosure is to provide a novel method of signal communication using Spread Spectrum and Frequency division multiple access (FDMA) concepts in the particular application of fluid coupling.

According to an embodiment of the present disclosure, the coils are chosen with Q factor maximum at selected frequency of 100 to 200 kHz.

According to an embodiment of the present disclosure, it provides contactless interface for signal transfer from primary to secondary windings at one or more frequencies with one or more channels of a predefined bandwidth. In one preferred embodiment, the signal is transferred from primary to secondary windings @ 13.56 MHz with 5 channels of 500 kHz BW.

According to an embodiment of the present disclosure, a system is used to convert the signals directly to Radio frequency (RF) using digital up converter (DUC) block and digital down converter (DDC) block for down conversion.

According to an embodiment of the present disclosure, a 4-bit Symbol mapping and orthogonal chirp sequence has been used for data modulation and to provide zero cross co-relation between the channels.

The foregoing has outlined, in general, the various aspects of the disclosure and is to serve as an aid to better understand the more complete detailed description which is to follow. In reference to such, there is to be a clear understanding that the present disclosure is not limited to the method or application if use detailed and illustrated herein. It is intended that any other advantages and objects of the present disclosure that become apparent or obvious from the detailed descriptions or illustration contained herein are within the scope of the present disclosure.

BRIEF DESCRIPTION OF THE DRAWINGS

The other objects, features and advantages will occur to those skilled in the art from the following description of the preferred embodiment and the accompanying drawings in which.

DETAILED DESCRIPTION

In the following descriptions of various embodiments, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present disclosure. The following detailed description is, therefore, not to be taken in a limiting sense, and the scope of the present disclosure is defined only by the appended claims.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure describes a system and method for contactless power and data transfer for hybrid connectors with fluid, pneumatic, electric, or electronic connectors. The system is adapted for coupling two devices wirelessly for transferring power and data from a first device to a second device. At the transmitting end, the system comprises of a power source, a self-resonating sinewave oscillator, a tuning circuit, a signal modulator, and a transmitter coil for processing and transmitting the power and/or data. At the receiving end, the system comprises a receiver coil, a proximity sensor, a signal de-modulator, a bridge rectifier, a DC-DC regulator for processing and providing the power and/or date to a load.

Figure 1:
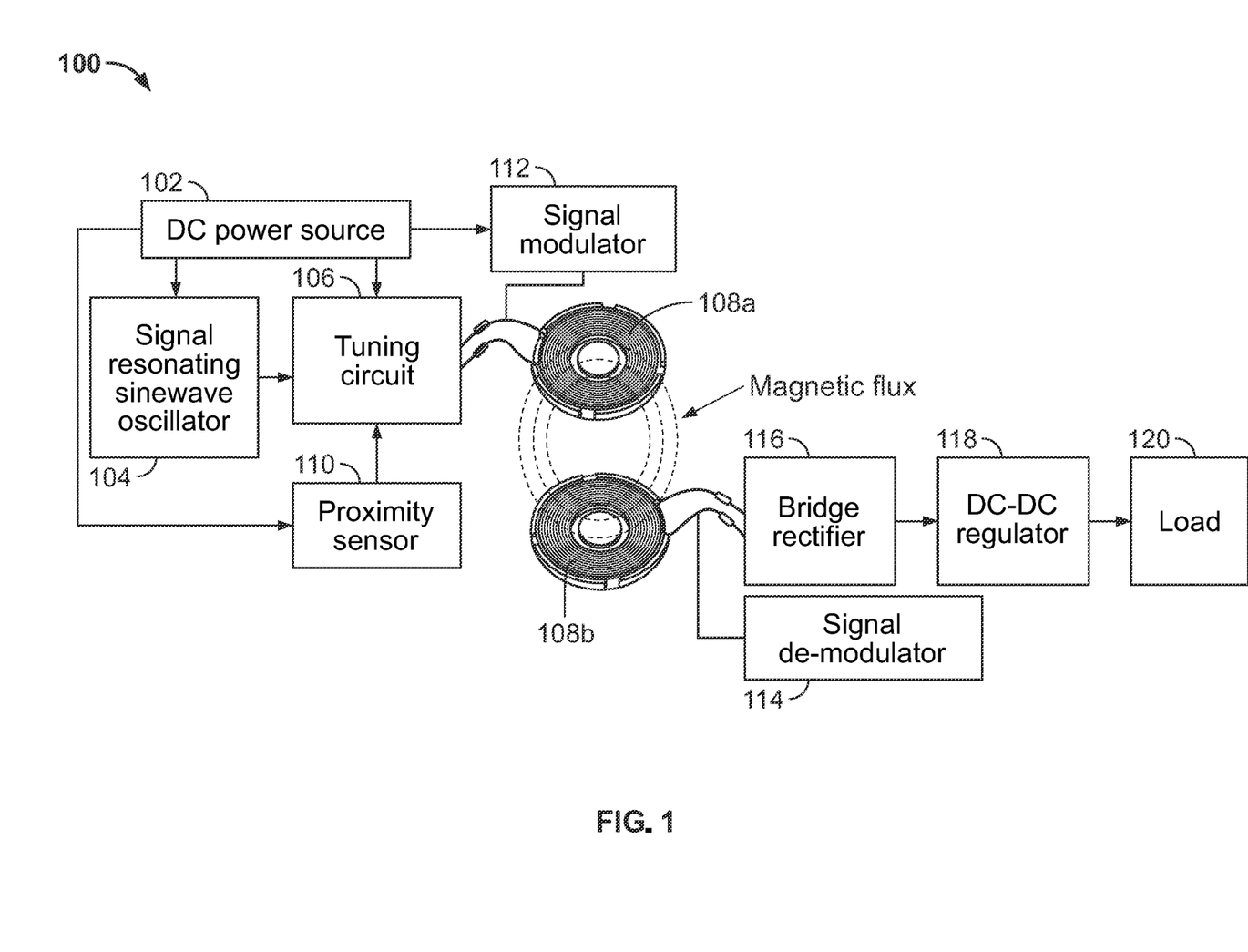
FIG. 1 illustrates a schematic diagram of a contactless power transfer system, according to an embodiment of the present disclosure.

FIG. 1 illustrates a schematic diagram of a contactless power transfer system (100), according to an embodiment of the present disclosure. The system (100) comprises of a power source (102), a self-resonating sinewave oscillator (104), a tuning circuit (106), a transmitter coil (108a), a receiver coil (108b) a proximity sensor (110), a signal modulator (112), a signal de-modulator (114), a bridge rectifier (116), a DC-DC regulator (118) and a load (120).

According to an embodiment of the present disclosure, the self-resonating sinewave oscillator (104) generates a sinewave signal at a predefined frequency upon receiving a power from the power source (102). The generated signal is tuned to a predefined frequency by the tuning circuit (106) and given to the transmitter coil (108a). The tuned signal is then modulated using the signal modulator (112). The proximity sensor (110) is used to detect the presence of mating part (coupler) and it enables the tuning circuit (106) based on the presence of mating part. At the receiving end, the modulated signal is received by the receiver coil (108b) which is then demodulated by the signal demodulator (114). Then the demodulated signal is converted into a DC signal/power using the bridge rectifier (116). The DC signal/power is provided to DC-DC Regulator (118) for regulating and providing the same to Load (120).

Figure 2:
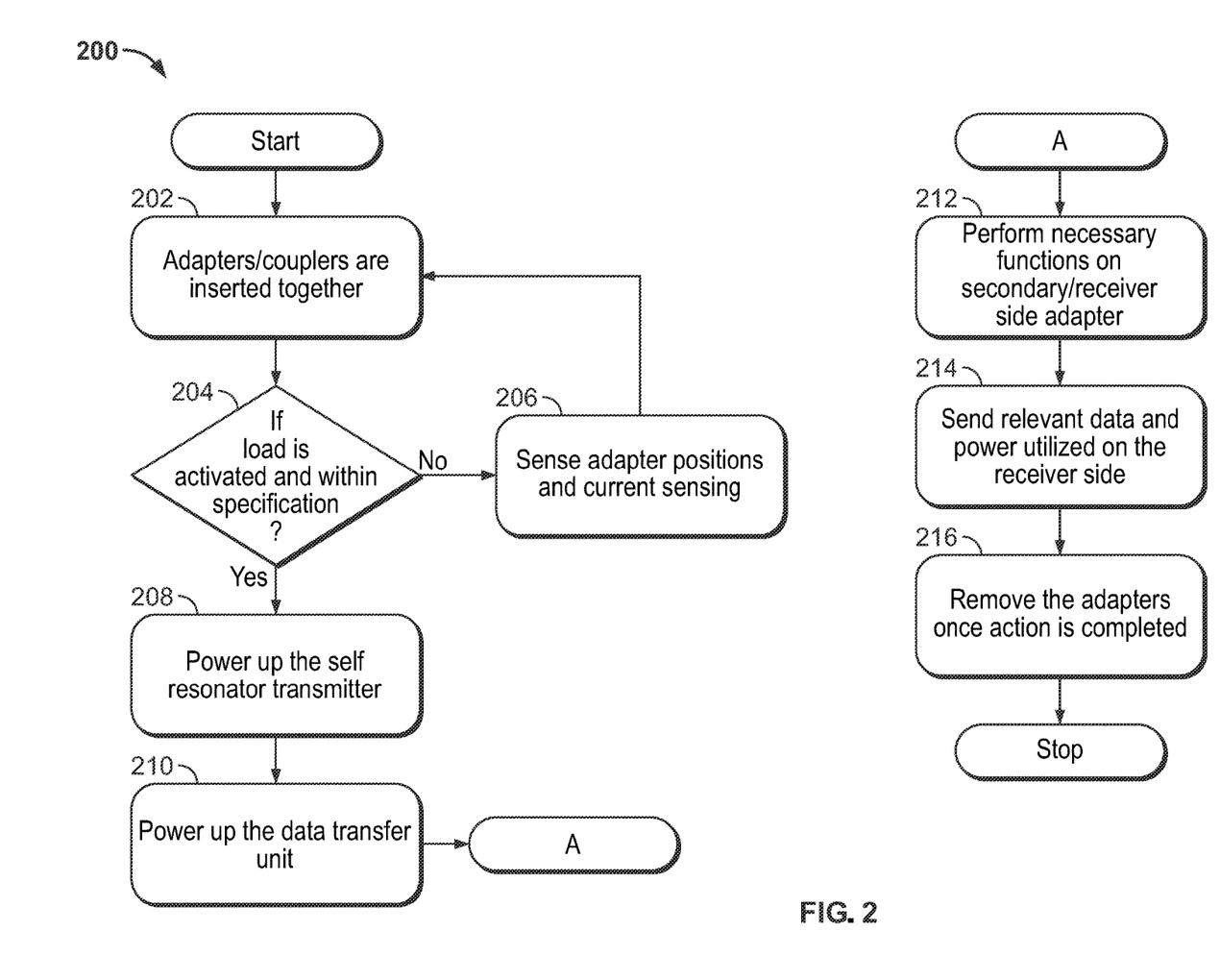
FIG. 2 illustrates a flow chart of a method of wireless power transfer, according to an embodiment of the present disclosure.

FIG. 2 illustrates a flow chart of a method of wireless power transfer (200), according to an embodiment of the present disclosure. The method is depicted as a collection of steps in a logical flow diagram, which represents a sequence of steps that can be implemented in hardware, software or a combination thereof.

At step 202, the adapters/couplers are inserted or placed together. Next at step 204, it is checked if the load is activated and is within the required specification. If the load is either not activated or failed to verify the required specification, then at step 206, it prompted to sense the adapter positions and current sensing and thereafter again the method begins from step 202. If at step 204, it is found that the load is activated and within the specified specification then at step 208, the self-resonator transmitter is powered up. And at step 210, the data transfer unit is also powered up.

Next at step 212, the necessary functions are performed on the secondary/receiver side of the adapter. At step 214, the relevant data and power utilized at the receiver side is sent. Finally, at step 216, the adapters are removed once the action is completed.

It should be noted here that the steps 202 to 216 are only illustrative and other alternatives can also be provided where one or more steps are added, one or more steps are removed, one or more steps are provided in a different sequence without departing from the scope of the claims herein.

Figure 3:
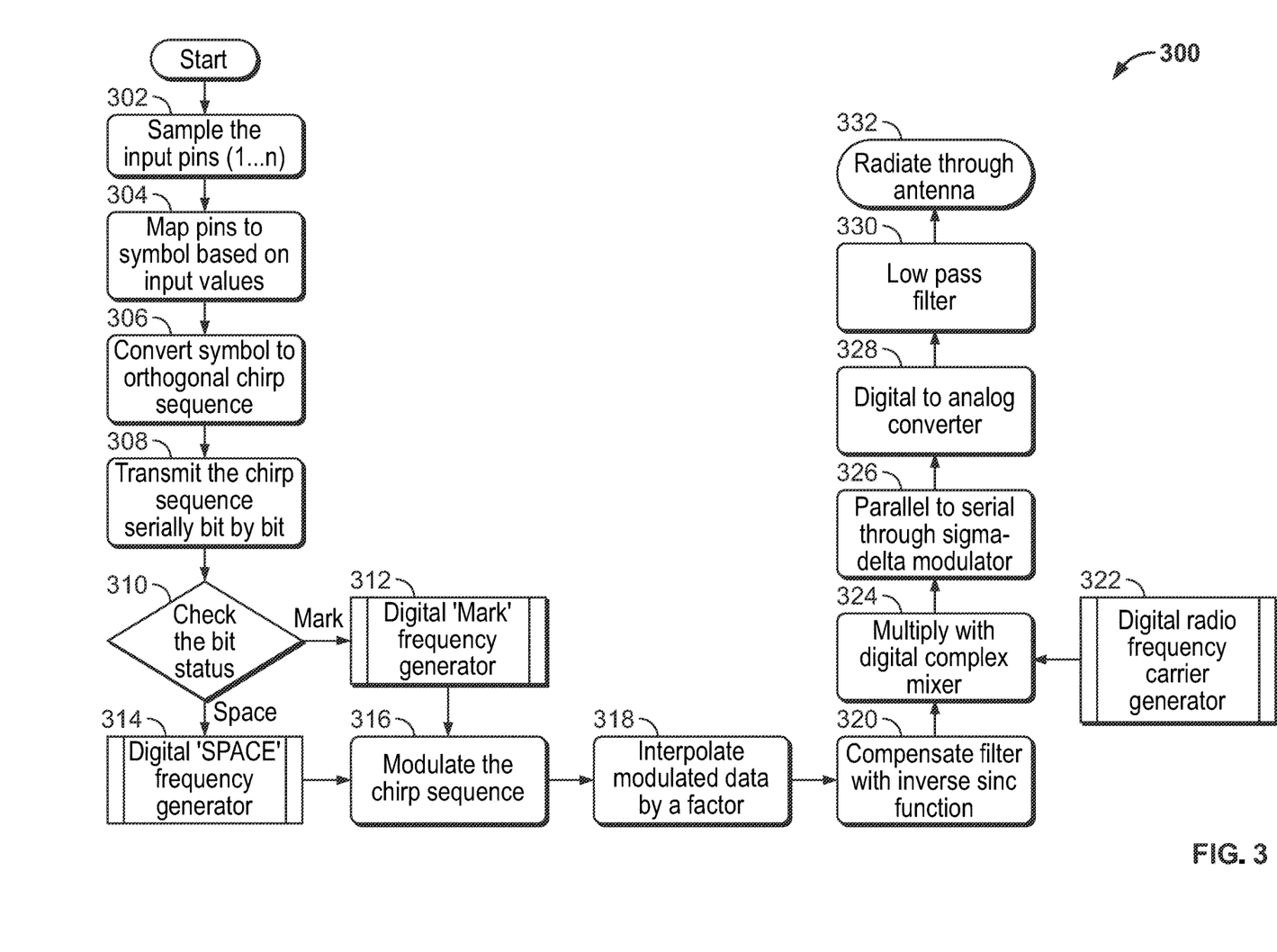
FIG. 3 illustrates a flow chart a method of wireless signal transfer for a transmitter single channel, according to an embodiment of the present disclosure.

FIG. 3 illustrates a flow chart (300) a method of wireless signal transfer for a transmitter single channel, according to an embodiment of the present disclosure. The method is depicted as a collection of steps in a logical flow diagram, which represents a sequence of steps that can be implemented in hardware, software or a combination thereof.

At step 302, the input pins (1 . . . n) are sampled and at step 304 the sampled pins are mapped to symbols based on the input values. Next at step 306, the symbols are converted to orthogonal chirp sequence and the chirp sequences are transmitted serially bit by bit at step 308. At step 310, the bit status is checked and at step 312, the bits are passed through digital 'mark' frequency generator and at step 314 the bits are passed through the digital 'SPACE' frequency generator. Next at step 316, the chirp sequence is modulated and the modulated data is interpolated by a factor at step 318.

Next at step 320, the filter is compensated with the inverse Sinc function and at step 322, the digital radio frequency carrier generator is used to generate and provide the radio frequency carrier signal to a digital complex mixer. At step 324, the signal received at step 320 is multiplied or processed with the signal received from the digital radio frequency carrier generator using the digital complex mixer. Further at step 326, the received signal is converted using parallel to serial through sigma-delta modulator and then the digital signal is converted to analog signal through digital to analog converter at step 328. Then at step 330, the signal is passed through the low pass filter before radiating the signal through an antenna at step 332.

Figure 4:
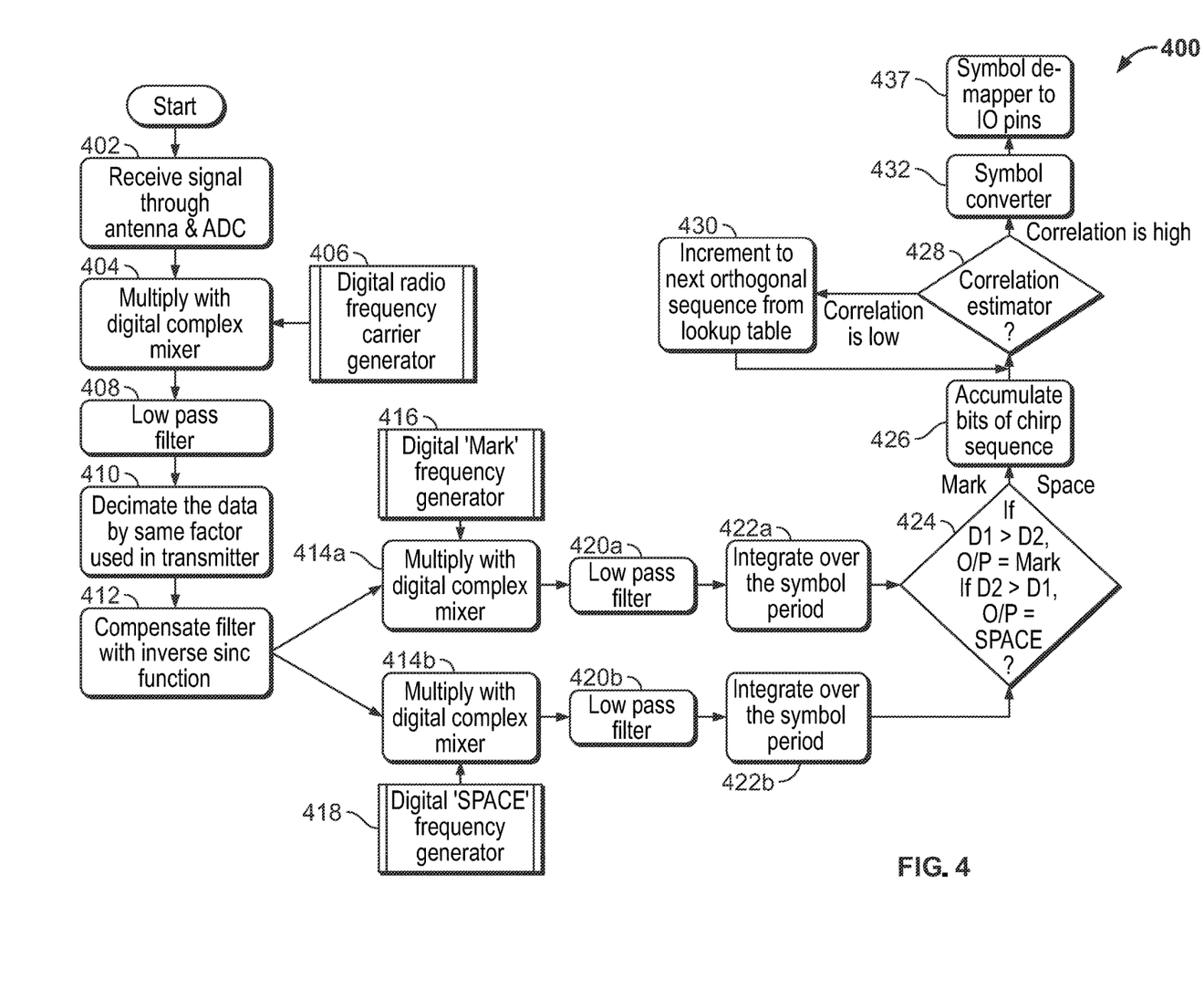
FIG. 4 illustrates a flow chart of steps of method of wireless signal transfer for receiver single channel, according to an embodiment of the present disclosure.

FIG. 4 illustrates a flow chart (400) of steps of method of wireless signal transfer for receiver single channel, according to an embodiment of the present disclosure. The method is depicted as a collection of steps in a logical flow diagram, which represents a sequence of steps that can be implemented in hardware, software or a combination thereof.

At step 402, the signal is received through an antenna and converted into the digital signal using the analog to digital converter (ADC). At step 404, the digital signal is multiplied using the digital complex mixer 404 with the signal received from the digital radio frequency carrier generator at step 406. Next at step 408, the signals are passed through the low pass filter and the data is decimated by same factor used in transmitter at step 410. At step 412, the filter is compensated with inverse Sinc function to process the signal which is multiplied at step 414a & 414b with the signals provided by a digital complex mixer and the digital 'Mark' and 'SPACE' frequency generated respectively at steps 416 and 418. The resulting signals are then passed through the low pass filters at steps 420a and 420b. At steps 422a and 422b, the signals are integrated over the symbol period. Subsequently at step 424, it is checked if D1>D2, the O/P=Mark and if D2 >D1, then O/P=SPACE. At step 426, the bits of chirp sequence is accumulated and the passed on to the correlation estimator at 428 and checked if the correlation is high or low. In case the correlation is low, then at step 430 it is incremented to next orthogonal sequence from lookup table. If the correlation is found to be high, then it is converted to the symbol using the symbol converter at step 432. Finally, at step 434, the symbol de-mapper converts it to IO pins.

Figure 5:
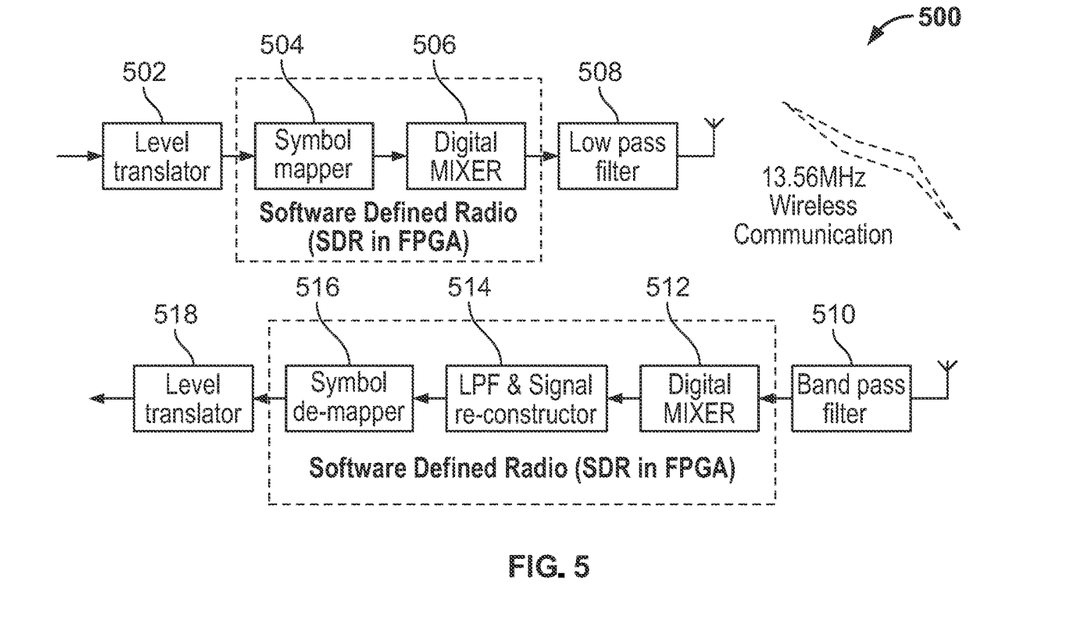
FIG. 5 is a block diagram of a wireless signal transfer system, according to an embodiment of the present disclosure.

FIG. 5 illustrates a block diagram of a wireless signal transfer system (500), according to an embodiment of the present disclosure. The system (500) comprises of level translator (502), a signal mapper (504), a digital mixer (506), a low pass filter (508), a band pass filter (510), a digital mixer (512), a LPF (low pass filter) & Signal Re-Constructor (514), a symbol de-mapper (516) and level translator (518).

According to an embodiment of the present disclosure, the digital input signal is passed through the level translator (502) and to the signal mapper (504) and to the digital mixer (506) in the software defined radio in FPGA. Further the signal is passed through the Low Pass Filter (508) and the signal is transmitted over a wireless communication. The signal is then passed through the band filter (510) and to the digital mixer (512), LPF & Signal Re-Constructor (514) and symbol de-mapper (516) and after through the level translator (518) the digital output is obtained.

Figure 6:
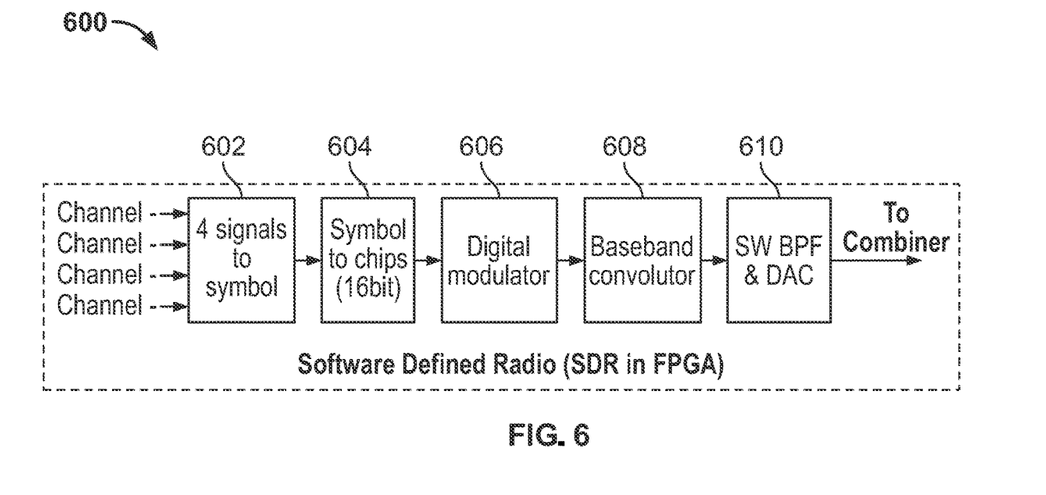
FIG. 6 illustrates a block diagram of a system for processing and combining signals for transmitting over a single channel, according to an embodiment of the present disclosure.

FIG. 6 illustrates a block diagram of a system (600) for processing and combining signals for transmitting over a single channel, according to an embodiment of the present disclosure. The system (600) comprises of a signal to symbol unit (602), a symbol to chirp sequence unit (604), a digital modulator (606), a baseband convolutor (608) and a SW Band Pass Filter (SW BPF) & Digital to analog converter (DAC) (610).

According to an embodiment of the present disclosure, the signal channels are converted or translated to symbols at the signal to symbol unit (602) and the symbols are then converted into chirp sequence at the symbol to chirp sequence unit (606). The digital modulator (606) modulates the signal. Then the modulated signal is passed to the baseband convolutor (608) for convoluting the signal and then passed through SW BPF & DAC (610) for filtering and converting into the analog signal.

Figure 7:
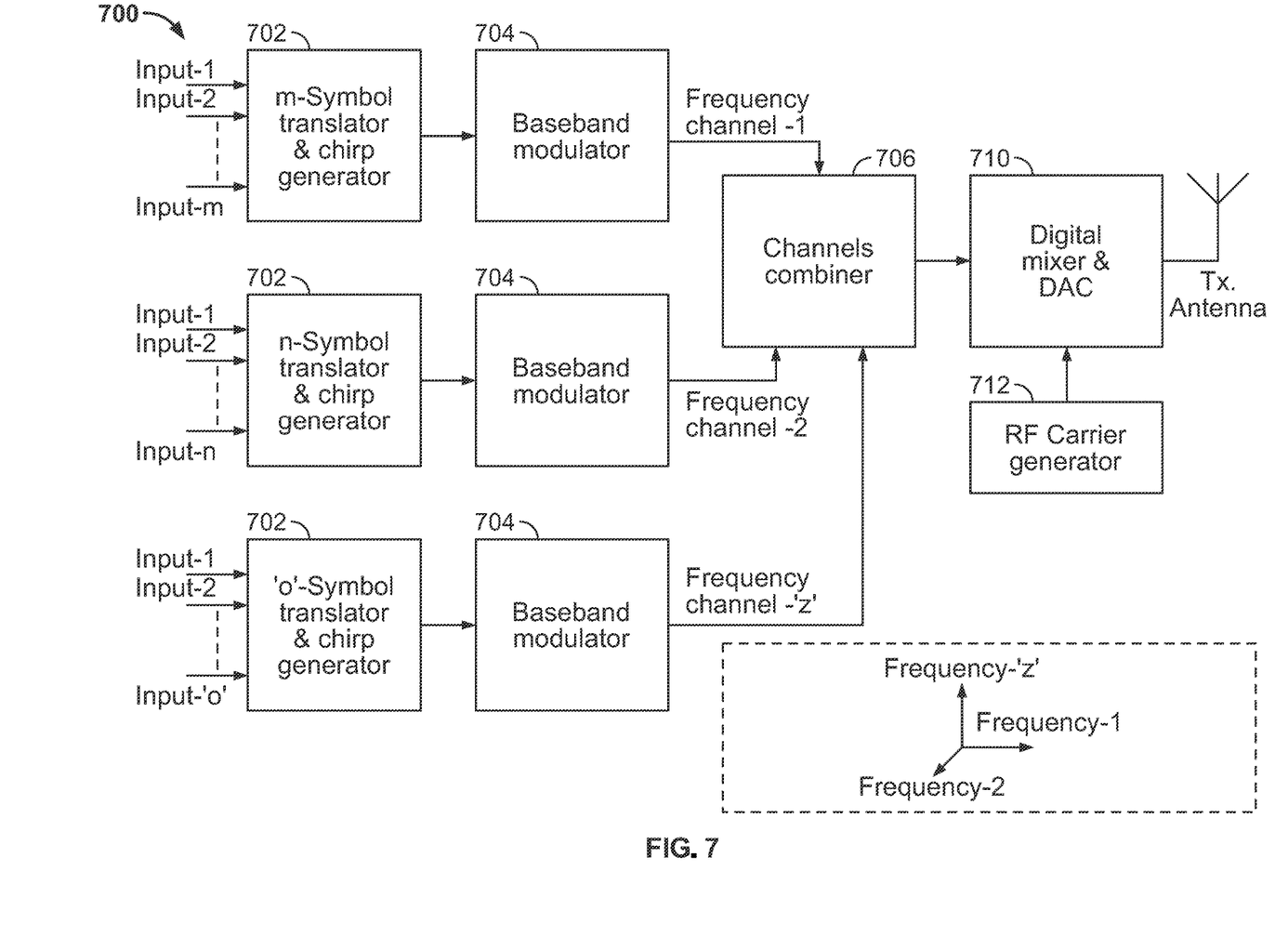
FIG. 7 illustrates a block diagram of a system for processing and combining a plurality of signals for transmitting over multiple channels, according to an embodiment of the present disclosure

FIG. 7 illustrates a block diagram of a system (700) for processing and combining a plurality of signals for transmitting over multiple channels, according to an embodiment of the present disclosure. The system (700) comprises of a plurality of m-Symbol translator and chirp generator (702), a plurality of Baseband modulator (704), a channel combiner (706), a digital mixer and Digital to analog converter (DAC) (708), and a RF Carrier generator (710).

According to an embodiment of the present disclosure, a plurality of signals is provided to the plurality of m-Symbol translator and chirp generator (702) which are processed and provided to the plurality of Baseband modulator (704). The baseband modulator provides signals from 1-$n$ frequency channels to the channel combiner (706). The channel combiner (706) processes the signal and sends the same to the digital mixer and DAC (708). The DAC (708) converts the signal to analog signal upon receiving RF signal from the RF carrier generator (710). Once the analog signal is available, it is transmitted through a transmitter.

Figure 8:
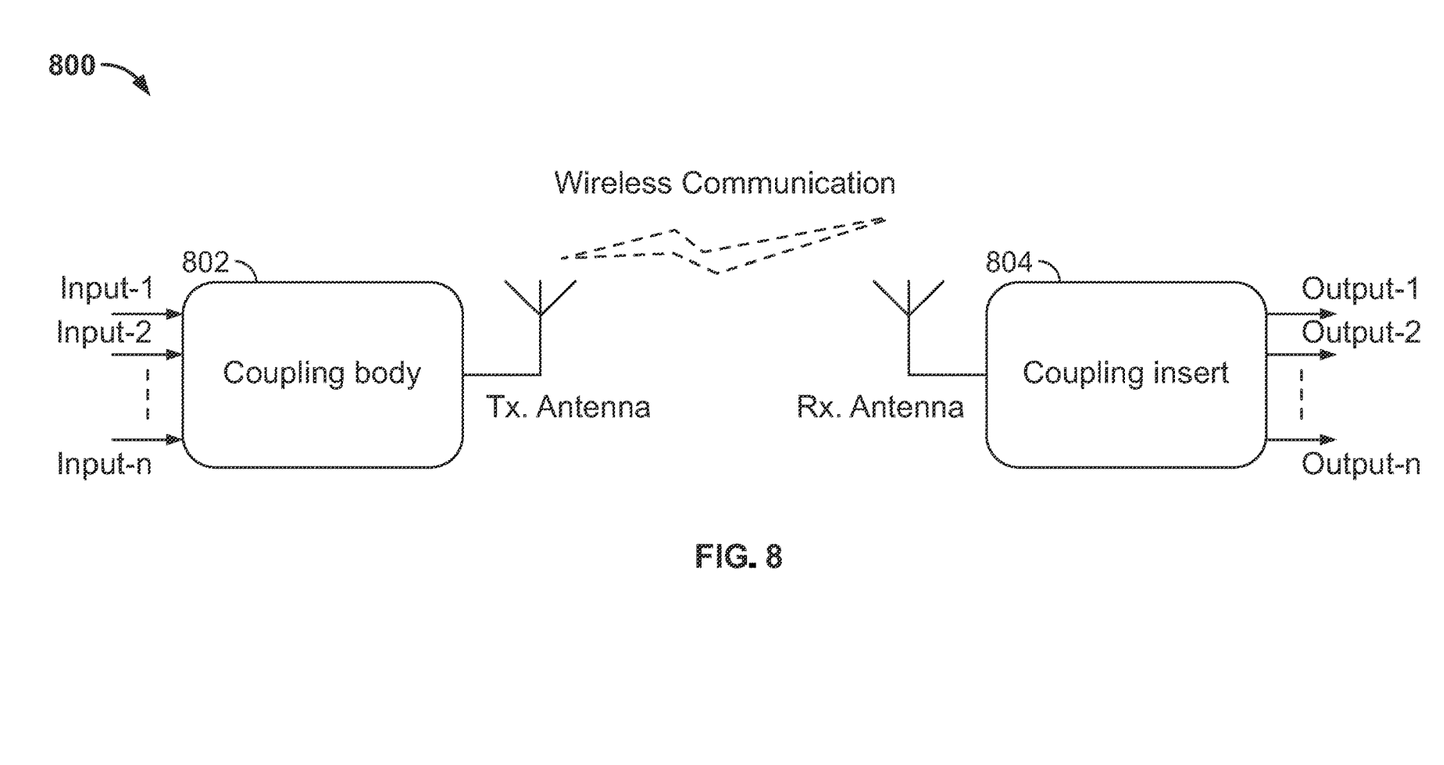
FIG. 8 illustrates a block diagram of a system for wirelessly connecting two devices for transferring power and data a first device to a second device, according to an embodiment of the present disclosure Although specific features of the present disclosure are shown in some drawings and not in others, this is done for convenience only as each feature may be combined with any or all of the other features in accordance with the present disclosure.

FIG. 8 illustrates a block diagram of a coupling system (800) for connecting two devices such that electrical power and/or data can be wirelessly transferred between a first device and a second device via the coupling system (800), according to an embodiment of the present disclosure. The coupling system (800) comprises a first coupling (802) and a second coupling (804) that are releasably coupleable with each other.

The couplings (802 and 804) are each configured with the electronics to facilitate the wireless transfer of power and/or data therebetween, as described above. In some embodiments, in addition to the componentry for the wireless transfer of power and/or data, the coupling system (800) also includes additional componentry, such as, but not limited to, coupling/connecting componentry for transmitting fluid/gas, vacuum, light via fiber optic cables, electrical power, and the like, and combinations thereof. Accordingly, in some embodiments the coupling system (800) is a hybrid connector (e.g., a coupling system that eliminates the need for multiple connections, such as a single connector for one or more fluids, and/or one or more fluids in addition to electronic connections and/or other types of connections). In some embodiments, the one or more fluid couplings that are integrated in one or both of the couplings (802 and 804) include valves so that the fluid is prevented from leaking when the couplings (802 and 804) are separated from each other.

The one or more input signals and/or power can originate from a first device (not shown) and can be received at the first coupling (802). The one or more input signals and/or power are processed at the first coupling (802) as per the method described in the above embodiments. The processed signals and/or power are transmitted wirelessly to the second coupling (804) which are then processed as per the method described in the above embodiments to generate one or more output signals that are communicated to a second device (not shown). While the terms "input signals" and "output signals" are used, it should be understood that each of the one or more signals that are wirelessly transferred between the couplings (802 and 804) can be transferred in either direction, or both directions, without limitation. Using the systems and methods herein, electrical power can be transferred between the couplings (802 and 804) in either direction also.

In one example implementation using the coupling system (800), the first device is a console or controller that includes one or more components such as, for example, a power source, a computer processor, additional controls/circuitry, a user interface, a chiller, a pump, light energy source, and additional like componentry. In some embodiments, a cable assembly extends from the console to the first coupling (802). The cable assembly includes multiple types of individual cables and/or tubes of differing types (e.g., fluid tubes, electrical power cables, electrical data cables (analog or digital), fiber optics, and the like). In some embodiments, the first coupling (802) is directed mounted to the console while having the multiple types of individual cables and/or tubes. The second coupling (804) is connected to a second device by another cable assembly that includes multiple types of individual cables or tubes of differing types. In some non-limiting examples, the second device can be an instrument that includes components such as, but not limited to, one or more sensors, user inputs, output devices (e.g., indicator lights, displays, tactile or audible outputs, etc.), controls, motors, heaters, coolers, light sources, and so on. The fact that the coupling system 800 (which is configured to wirelessly transmit data signals and/or electrical power) is used to connect the first device to the second device can greatly enhance the overall system because the number of individual mechanical connections between the first coupling (802) and the second coupling (804) can be advantageously reduced.

Although the embodiments herein are described with various specific embodiments, it will be obvious for a person skilled in the art to practice the invention with modifications. However, all such modifications are deemed to be within the scope of the claims. It is also to be understood that the following claims are intended to cover all of the generic and specific features of the embodiments described herein and all the statements of the scope of the embodiments which as a matter of language might be said to fall there between.

The invention claimed is:

1. A coupling system, comprising:
a first signal generator configured to translate a first input to a first generated signal;
a second signal generator configured to translate a second input to a second generated signal;
a first baseband modulator configured to provide a first frequency channel signal based on the first generated signal;
a second baseband modulator configured to provide a second frequency channel signal based on the second generated signal;
a channel combiner configured to combine the first frequency channel signal and the second frequency channel signal into a combined signal;
a radio frequency carrier signal generator configured to provide a carrier signal;
a mixer configured to provide a radio frequency signal based on the combined signal and the carrier signal;
a first coupling comprising a first fluid tube and a first antenna configured to transmit the radio frequency signal; and
a second coupling that is releasably coupleable with the first coupling and that comprises a second fluid tube and a second antenna,
wherein, when the first and second couplings are coupled together, the first and second tubes are joined to define a pathway for transmitting fluid through the coupling system, and
wherein the first and second couplings are configured to use the first and second antennas to wirelessly transmit the radio frequency signal therebetween when the first and second couplings are coupled together.

2. The coupling system of claim 1, wherein each of the first and second couplings include a respective fluid valve that blocks and seals the pathway when the first and second couplings are uncoupled.

3. The coupling system of claim 1, wherein the first and second couplings are configured to wirelessly transmit multiple electrical data signals therebetween when the first and second couplings are coupled together.

4. The coupling system of claim 1, wherein the first and second couplings are further configured to use the first and second antennas to wirelessly transmit electrical power therebetween when the first and second couplings are coupled together.

5. A coupling system, comprising:
a first signal generator configured to translate a first input to a first generated signal;
a second signal generator configured to translate a second input to a second generated signal;
a first baseband modulator configured to provide a first frequency channel signal based on the first generated signal;
a second baseband modulator configured to provide a second frequency channel signal based on the second generated signal;
a channel combiner configured to combine the first frequency channel signal and the second frequency channel signal into a combined signal;
a radio frequency carrier signal generator configured to provide a carrier signal;
a mixer configured to provide a radio frequency signal based on the combined signal and the carrier signal;
a first coupling comprising a first fluid tube and a first antenna configured to transmit the radio frequency signal; and
a second coupling that is releasably coupleable with the first coupling and that comprises a second fluid tube and a second antenna, wherein, when the first and second couplings are coupled together, the first and second tubes are joined to define a pathway for transmitting fluid through the coupling system, and wherein the first and second couplings are configured to use the first and second antennas and the radio frequency signal to wirelessly transmit electrical power therebetween when the first and second couplings are coupled together.

6. The coupling system of claim 5, wherein each of the first and second couplings include a respective fluid valve that blocks and seals the pathway when the first and second couplings are uncoupled.

7. The coupling system of claim 5, the first and second couplings are further configured to wirelessly transmit one or more electrical data signals therebetween when the first and second couplings are coupled together.

8. A coupling system, comprising:
a first signal generator configured to translate a first input to a first generated signal;
a second signal generator configured to translate a second input to a second generated signal;
a first baseband modulator configured to provide a first frequency channel signal based on the first generated signal;
a second baseband modulator configured to provide a second frequency channel signal based on the second generated signal;
a channel combiner configured to combine the first frequency channel signal and the second frequency channel signal into a combined signal;
a radio frequency carrier signal generator configured to provide a carrier signal;
a mixer configured to provide a radio frequency signal based on the combined signal and the carrier signal;
a first coupling comprising a first fluid tube and a first antenna configured to transmit the radio frequency signal; and
a second coupling that is releasably coupleable with the first coupling and that comprises a second fluid tube and a second antenna, wherein, when the first and second couplings are coupled together, the first and second tubes are joined to define a pathway for transmitting fluid through the coupling system, and wherein the first and second couplings are configured to use the first and second antennas to wirelessly transmit: (i) the radio frequency signal therebetween when the first and second couplings are coupled together and (ii) electrical power therebetween when the first and second couplings are coupled together.

9. The coupling system of claim 8, wherein the first coupling further comprises a first valve and the second coupling further comprises a second valve, wherein the first and second valves open to define the pathway for transmitting the fluid when the first and second couplings are coupled together, and wherein each of the first and second valves block and seal the pathway when the first and second couplings are uncoupled.

10. The coupling system of claim 8, wherein the first and second couplings are configured to wirelessly transmit multiple electrical data signals therebetween when the first and second couplings are coupled together.

* * * * *

UNITED STATES PATENT AND TRADEMARK OFFICE
CERTIFICATE OF CORRECTION

PATENT NO. : 11,605,986 B2
APPLICATION NO. : 16/765264
DATED : March 14, 2023
INVENTOR(S) : Ramabhadran Sampath, Vijay Tippanna Talikoti and Gautham Ramamurthy It is certified that error appears in the above-identified patent and that said Letters Patent is hereby corrected as shown below:

In the Specification

Column 1, Lines 8-9, delete "PCT/M2018/001576," and insert -- PCT/IB2018/001576, --.

Signed and Sealed this
Fifteenth Day of August, 2023

Katherine Kelly Vidal
*Director of the United States Patent and Trademark Office*